(12) United States Patent
Kishiyama

(10) Patent No.: US 9,113,468 B2
(45) Date of Patent: Aug. 18, 2015

(54) RADIO COMMUNICATION SYSTEM, RADIO BASE STATION APPARATUS AND MOBILE TERMINAL APPARATUS

(75) Inventor: Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 209 days.

(21) Appl. No.: 13/819,394

(22) PCT Filed: Aug. 31, 2011

(86) PCT No.: PCT/JP2011/069823
§ 371 (c)(1),
(2), (4) Date: Mar. 20, 2013

(87) PCT Pub. No.: WO2012/029873
PCT Pub. Date: Mar. 8, 2012

(65) Prior Publication Data
US 2013/0170406 A1 Jul. 4, 2013

(30) Foreign Application Priority Data
Aug. 31, 2010 (JP) .................................. 2010-194827

(51) Int. Cl.
H04W 72/04 (2009.01)
H04L 1/00 (2006.01)
H04L 1/16 (2006.01)
H04J 1/02 (2006.01)
H04L 5/00 (2006.01)
H04B 7/26 (2006.01)

(52) U.S. Cl.
CPC ......... *H04W 72/0453* (2013.01); *H04B 7/2615* (2013.01); *H04J 1/02* (2013.01); *H04L 1/0026* (2013.01); *H04L 1/1671* (2013.01); *H04L 5/0053* (2013.01); *H04W 72/04* (2013.01)

(58) Field of Classification Search
None
See application file for complete search history.

(56) References Cited

U.S. PATENT DOCUMENTS

2008/0225788 A1* 9/2008 Inoue et al. .................. 370/329
2009/0196204 A1* 8/2009 Astely et al. ................. 370/280
2011/0013581 A1   1/2011 Lee et al.
(Continued)

FOREIGN PATENT DOCUMENTS

WO      2009/113836 A1    9/2009
WO   WO 2009113836 A1 *  9/2009

OTHER PUBLICATIONS

Office Action issued in corresponding Japanese Application No. 2010-194827, mailed Aug. 6, 2013 (7 pages).
(Continued)

*Primary Examiner* — Hassan Phillips
*Assistant Examiner* — Ayanah George
(74) *Attorney, Agent, or Firm* — Osha Liang LLP

(57) ABSTRACT

Provided are a radio communication system, a radio base station apparatus and a mobile terminal apparatus to which duplex schemes are applied effectively in a communication system of which a frequency band is formed with a plurality of fundamental frequency blocks. In the radio communication system of which a frequency band allocated to radio communication between the radio base station apparatus and the mobile terminal apparatus is configured by adding or deleting fundamental frequency blocks, the fundamental frequency blocks of the frequency band have at least a first fundamental frequency block and a second fundamental frequency block, the first fundamental frequency block is used to perform FDD-based radio communication and the second fundamental frequency block is used to perform TDD-based or half duplex FDD-based radio communication.

10 Claims, 11 Drawing Sheets

(56) References Cited

U.S. PATENT DOCUMENTS

| | | | | |
|---|---|---|---|---|
| 2011/0200143 A1* | 8/2011 | Koo et al. | ............ | 375/299 |
| 2011/0250918 A1* | 10/2011 | Jen | ............ | 455/509 |
| 2011/0317657 A1* | 12/2011 | Chmiel et al. | ............ | 370/331 |
| 2012/0108254 A1* | 5/2012 | Kwon et al. | ............ | 455/450 |

OTHER PUBLICATIONS

Decision of Final Rejection in counterpart Japanese Application No. 2010-194827 mailed Apr. 2, 2014 (4 pages).
Decision to Grant a Patent issued in corresponding Japanese Application No. 2010-194827, mailed Aug. 26, 2014 (4 pages).
International Search Report issued in PCT/JP2011/069823 mailed on Oct. 11, 2011 (1 pages).
Motorola; "Control signalling Design for Supporting Carrier Aggregation"; 3GPP TSG RAN1#56, R1-090792; Athens, Greece; Feb. 9-13, 2009 (8 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

RADIO COMMUNICATION SYSTEM, RADIO BASE STATION APPARATUS AND MOBILE TERMINAL APPARATUS

TECHNICAL FIELD

The present invention relates to a radio communication system, a radio base station apparatus and a mobile terminal apparatus in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing spectral efficiency and peak data rates, providing low delay and so on, long-term evolution (LTE) has been under study (Non Patent Literature 1). In LTE, as the multi access scheme different from W-CDMA, OFDMA (Orthogonal Frequency Division Multiple Access) is adopted on the downlink and SC-FDMA (Single Carrier Frequency Division Multiple Access) is adopted on the uplink.

In a third-generation system (W-CDMA), it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further improvement of spectral efficiency and peak data rates and so on, successor systems to LTE have been under study (such a system is called, for example, LTE Advanced or LTE Enhancement, and hereinafter, this system is referred to as LTE-A).

In LTE-A, for the purposes of further improving spectral efficiency and peak throughputs, allocation of a broader frequency band than that in LTE has been under study. And, in LTE-A (for example, Rel. 10), one of requirements is backward compatibility with LTE and a study has been made about adoption of a frequency band having a plurality of fundamental frequency blocks (component carriers: CCs) where the bandwidth of a fundamental frequency block can be also used in LTE.

CITATION LIST

Non Patent Literature

Non-Patent Literature 1: 3GPP, TR25.912 (V7.1.0), "Feasibility study for Evolved UTRA and UTRAN", September 2006

SUMMARY OF INVENTION

Technical Problem

By the way, the duplex schemes adopted in the radio communication system between a mobile station apparatus and a base station include FDD (Frequency Division Duplexing) scheme and TDD (Time Division Duplexing) scheme. The FDD scheme is such that uplink communication and downlink communication are performed with mutually different frequencies (pair band) and the TDD scheme is such that uplink communication and downlink communication are performed with the same frequencies but separated in time from each other.

In the LTE system, the same radio access scheme is adopted in FDD and TDD and maximum commonality between FDD and TDD is assured. Hence, in the LTE system, either scheme of FDD and TDD can be applied. In the meantime, aggregating a plurality of fundamental frequency blocks into a wide frequency band by adding or deleting fundamental frequency blocks of the frequency band is called "carrier aggregation", and in a system to which the carrier aggregation is applied, it is a subject to be studied in the future which duplex scheme is applied to each fundamental frequency block to control the fundamental frequency block and there is a demand for a radio communication system to which the duplex scheme is applied in an effective manner.

The present invention was carried out in view of the foregoing and aims to provide a radio communication system, a radio base station apparatus and a mobile terminal apparatus to which duplex schemes are applied in an effective manner in a system of which a frequency band is configured by adding or deleting fundamental frequency blocks.

Solution to Problem

The present invention provides a radio communication system having a radio base station apparatus and a mobile terminal apparatus, of which a frequency band allocated to radio communication between the radio base station apparatus and the mobile terminal apparatus is configured by adding or deleting fundamental frequency blocks, wherein when the fundamental frequency blocks of the frequency band has a first fundamental frequency block and a second fundamental frequency block, the radio base station apparatus performs FDD-based radio communication with the first fundamental frequency block and performs TDD-based radio communication or half duplex FDD-based radio communication with the second fundamental frequency block.

According to this structure, as different duplex schemes are adopted in the communication system having a frequency band formed with a plurality of fundamental frequency blocks, it is possible to transmit information with efficiency by controlling the duplex schemes applied to transmission and reception of information pieces transmitted and received between the radio base station apparatus and the mobile terminal apparatus.

Advantageous Effects of Invention

According to the present invention, is possible to provide a radio communication system, a radio base station apparatus and a mobile terminal apparatus to which duplex schemes are applied in an effective manner.

DESCRIPTION OF EMBODIMENTS

In a radio communication system to which the present invention is applied, carrier aggregation is performed in which a frequency band (system band) is configured by adding or deleting a plurality of fundamental frequency blocks (component carriers). First description is made about a carrier aggregation system with reference to FIG. 1.

Figure 1:
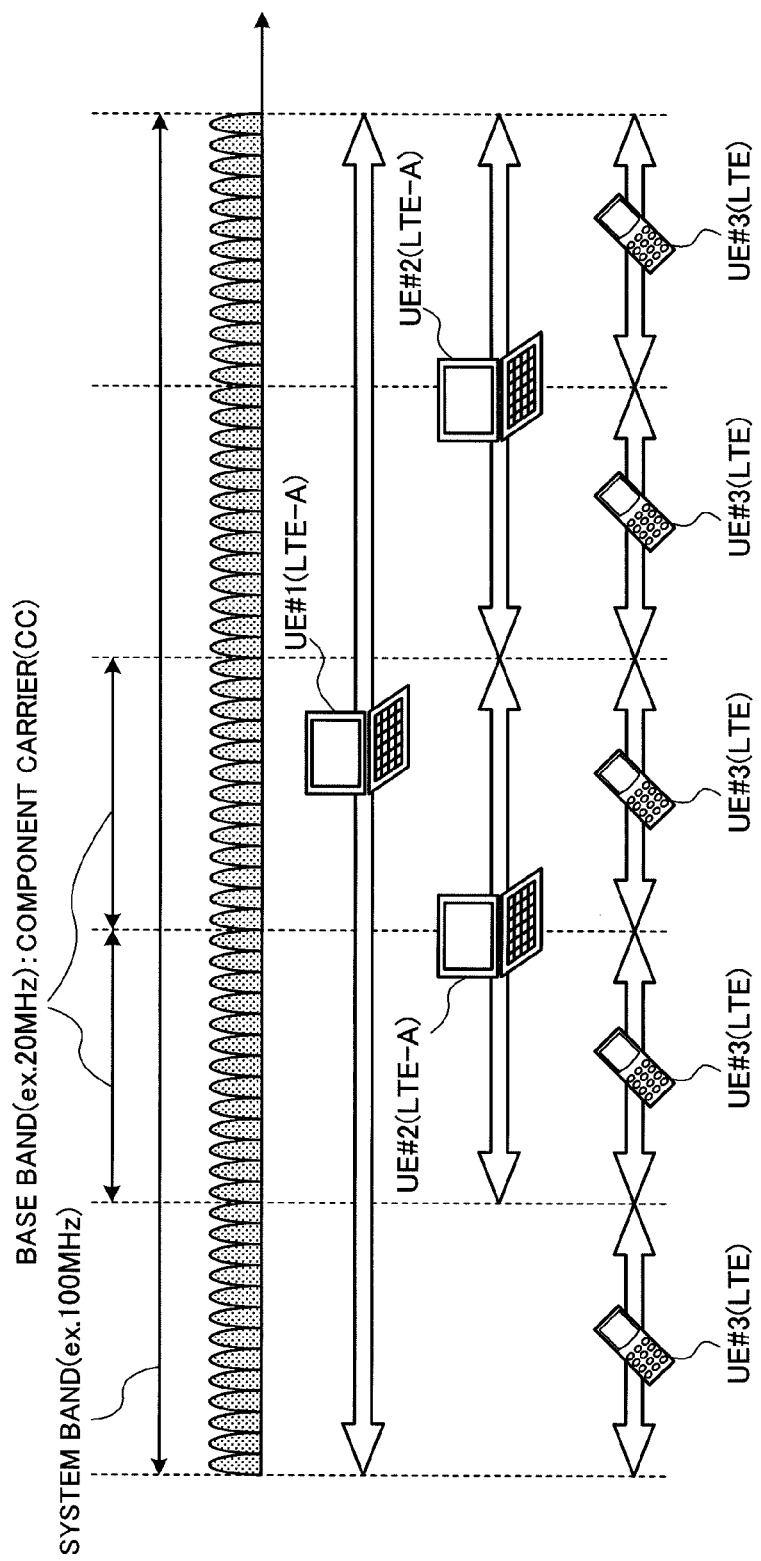
FIG. 1 is a diagram illustrating a hierarchical bandwidth structure agreed in LTE-A.

FIG. 1 is a diagram illustrating a hierarchical band structure agreed in the LTE-A system. In the hierarchical band structure in the example illustrated in FIG. 1, there coexist an LTE-A system which is a first mobile communication system having a first system band formed with a plurality of component carriers (CCs) and an LTE system which is a second mobile communication system having a second system band formed with one comportment carrier. For example, in the LTE-A system, radio communication is performed with use of a variable system band width of maximum 100 MHz and in the LTE system, radio communication is performed with use of a variable system band width of maximum 20 MHz. The system band of the LTE-A system include at least one component carrier which is the unit of system band of the LTE system, and the number of component carriers is increased or decreased dynamically or semistatically. This band broadening with a plurality of component carriers is called carrier aggregation.

For example, in FIG. 1, the system band of the LTE-A system is a system band (20 MHz×5=100 MHz) including bands of five component carriers where one component carrier is a system band of the LTE system (baseband: 20 MHz).

In FIG. 1, a mobile terminal apparatus #1 (UE: User Equipment #1) is a user terminal supporting the LTE-A system (also supporting the LTE system) and can support the system band up to 100 MHz. UE #2 is a user terminal supporting the LTE-A system (also supporting the LTE system) and can support the system band up to 40 MHz (20 MHz×2=40 MHz). UE #3 is a user terminal supporting the LTE system (not supporting the LTE-A system) and can support the system band up to 20 MHz (baseband).

Figure 2:
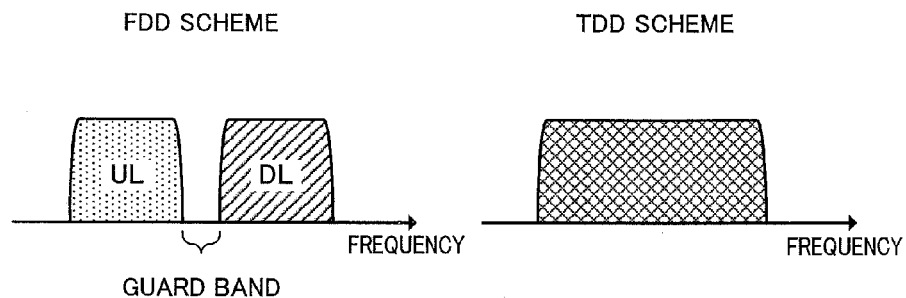
FIG. 2 is a diagram for explaining the FDD scheme and the TDD scheme.

Besides, as described above, the duplex schemes applied to the radio communication system formed with the mobile station apparatus and the radio base station apparatus include the FDD scheme and the TDD scheme (see FIG. 2). For example, when the FDD scheme is applied to the LTE system, in view of backward compatibility, the FDD scheme is considered to be applied to each fundamental frequency block (CC) in the LTE-A. However, in the LTE-A system, it is necessary to extend the frequency bandwidth so as to realize high speed transmission and the FDD has difficulty in ensuring pair bands for uplink and downlink. And, in the TDD scheme, the period where uplink and downlink transmissions are both allowed is restricted and there is considered to be a problem of increase in transmission delay and reduction in coverage. Therefore, if the same scheme is applied to all the CCs, there may arise communication failure.

On the other hand, in the FDD scheme, different frequency bands are allocated to uplink and downlink communications and transmission is always possible in both of uplink and downlink (various information such as control information and data can be allocated to uplink and downlink radio resources in all transmission time intervals (TTIs) (subframes in LTE)). Therefore, this scheme has advantages of being able to set the timings of transmission and reception of various information pieces flexibly while suppressing transmission delay. And, in the TDD scheme, the uplink communication and the downlink communication use the same frequency band, and the transmission and reception lines have the same propagation properties including instantaneous fluctuations of fading on the uplink and downlink. In view of this, the TDD scheme has advantageous of being able to reduce feedback of channel state information from a receiving section by applying a weighting factor (channel factor) used in reception to weighting in transmission (Channel reciprocity).

Then, the present inventors have conceived that, in the carrier aggregation system in which a plurality of fundamental frequency blocks are aggregated into a wide band, the FDD scheme and the TDD scheme (or half duplex FDD scheme) are applied in combination to the different fundamental frequency blocks and completed the present invention. And, the present inventors have also conceived that, in the carrier aggregation system in which a plurality of component carriers are aggregated into a wide band, when the different duplex schemes are applied, allocation of information of a control system required for communication control (control information) and allocation of information of a data system (data information) are set in consideration of the duplex schemes thereby to control transmission of the information and completed the present invention.

The following description is made, with reference to the drawings, about an embodiment of the present invention. Here, in the present embodiment, description is made of the example where the present invention is applied to LTE-A, however, the present invention is not limited to the case where it is applied to LTE-A. In carrier aggregation where a plurality of fundamental frequency blocks are aggregated into a wide frequency band, the preset invention may be applied to any radio communication system as far as different duplex schemes are applied to the radio communication system.

In the following description, it is assumed that there are two fundamental frequency blocks (CCs), however the present invention is not limited to this. Even when there are three or more CCs, the FDD scheme and the TDD scheme may be applied in combination as appropriate.

<Radio Communication System Configured with FDD Scheme/TDD Scheme>

The radio communication system illustrated in the present embodiment is a radio communication system of which a frequency band to be allocated to radio communication between a radio base station apparatus and a user terminal (mobile terminal apparatus) is configured by adding or deleting fundamental frequency blocks. When the frequency band is formed with a plurality of fundamental frequency blocks, the frequency band has a first fundamental frequency block for performing FDD based radio communication and a second fundamental frequency block for performing TDD based radio communication (see FIG. 3).

Figure 3:
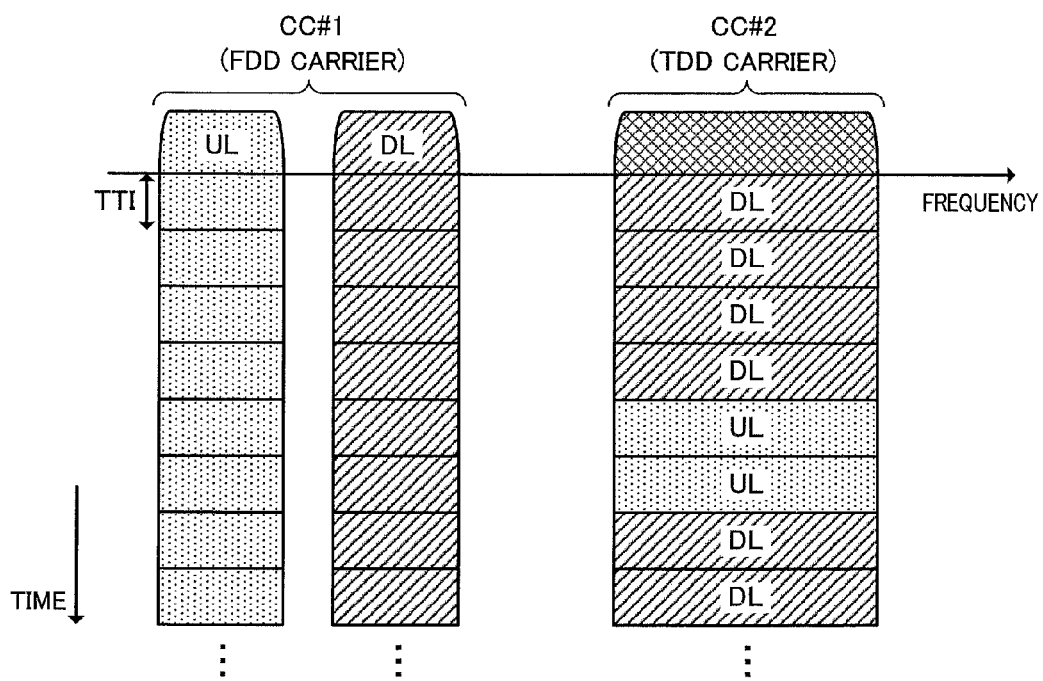
FIG. 3 is a diagram illustrating an example of a radio communication system to which the FDD and TDD schemes are applied according to the present embodiment.

In FIG. 3, FDD based radio communication is performed in the first fundamental frequency block (CC #1) and TDD based radio communication is performed in the second fundamental frequency block (CC #2). In the CC #1 to which the FDD scheme is applied, uplink communication and downlink communication are performed with mutually different frequencies (pair bands) and in the CC #2 to which the TDD scheme is applied, uplink communication and the downlink communication are performed with the same frequencies.

In the CC #1, different frequency bands are assigned to uplink and downlink communications so that transmission is always possible on the uplink and downlink. Therefore, it is possible to determine the timings of transmission and reception of various information pieces while suppressing the transmission delay. On the other hand, in the CC #2, the same frequency bands are used in uplink communication and downlink communication and therefore, and radio communication can be performed using channel reciprocity.

Hence, transmission of information can be performed with efficiency by controlling allocation of various information such as data, control information to control radio communication between the radio base station apparatus and the mobile terminal apparatus and so on to each CC from the viewpoint of backward compatibility with the LTE system and advantages of the two duplex schemes. The control information includes a synchronization channel information, a PBCH signal, a PRACH signal, a downlink L1/L2 control channel signal, an uplink L1/L2 control channel signal and so on.

The following is concrete description about an allocation method of various information pieces (channel signal, reference signal and son on) to plural fundamental frequency blocks when different duplex schemes are applied to the fundamental frequency blocks.

<Synchronization Channel/PBCH/PRACH>

Figure 4:
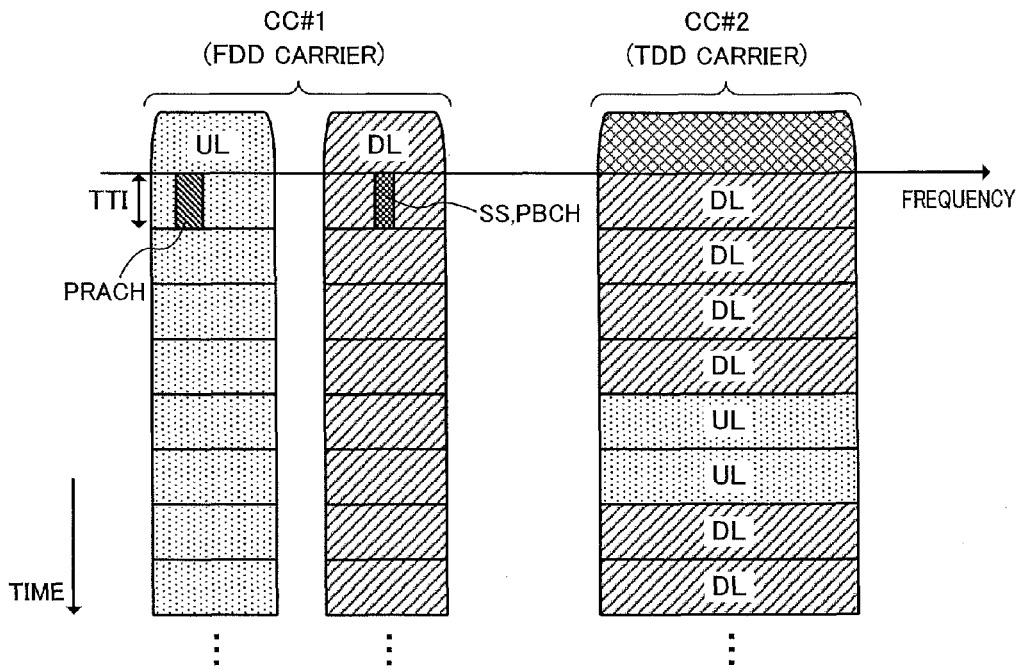
FIG. 4 is a diagram illustrating an example of a radio communication system to which the FDD and TDD schemes are applied according to the present embodiment.

FIG. 4 illustrates an example of setting of various information about initial accesses of the mobile terminal apparatus to the radio base station apparatus in the radio communication system which is formed with the first fundamental frequency block (CC #1) to which the FDD scheme is applied and the second fundamental frequency block (CC #2) to which the TDD scheme is applied.

Channels relating to the initial accesses of the mobile terminal apparatus to the radio base station apparatus include, for example, a synchronization channel (SS: synchronization signal), a PBCH (Physical Broadcast CHannel), a PRACH (Physical Random Access CHannel) and so on.

The synchronization channel is used for cell search by the mobile terminal apparatus to detect a base station apparatus to connect. The mobile terminal apparatus does not know a frequency band width of a cell to connect at time of cell search, and therefore, it is transmitted with use of a center frequency (for example, 72 subcarriers (in fact, 63 subcarriers out of 72 subcarriers) irrespective of the system frequency bandwidth. And, the synchronization channel may be configured to be multiplexed and transmitted in each of the 1st subframe #1 and the $6^{th}$ subframe #6 in a radio frame ($1^{st}$ subframe #1 to $10^{th}$ subframe #10) of 10 ms at intervals of 5 ms.

The PBCH is a shared control channel to broadcast system-specific and cell-specific control information to the entire cell and is a physical channel which is generally received by the mobile terminal just after the cell search. As the mobile terminal apparatus after cell search does not know the frequency bandwidth of the cell to connect, the PBCH is transmitted using the center frequency of the frequency band (for example, 72 subcarriers (6 RBs) irrespective of the system frequency bandwidth. And, the PBCH signal may be configured to be multiplexed to first 4 OFDM symbols of the second slot in the first subframe #1 and transmitted at intervals of 40 ms.

The PRACH is a physical channel for initial accesses for performing setting to start communication, which channel is transmitted from each of mobile terminal apparatuses at the start of communication and establishing synchronization between uplink mobile terminal apparatuses. The PRACH signal is transmitted with a predetermined subframe (the transmission bandwidth is 72 subcarriers) indicated by the radio base station apparatus.

In this embodiment, transmission and reception of information relating to these initial accesses are performed using either of the first fundamental frequency block (CC #1) to which the FDD is applied and the second fundamental frequency block (CC #2) to which the TDD is applied.

In FIG. 4, the synchronization channel (SS) and the PBCH are allocated to downlink radio resources of the CC #1 to which the FDD scheme is applied (for example, 72 subcarriers of the center frequency in the used frequency band) to transmit information, and the PRACH is allocated to uplink radio resources of the CC #1 to which the FDD scheme is applied to transmit information. That is, the synchronization channel and PBCH, and the PRACH are allocated to the pair bands of the first fundamental frequency block to which the FDD scheme is applied for information transmission.

On the other hand, centering on the TDD scheme, the synchronization channel and PBCH may be allocated to downlink radio resources of the CC #2 to which the TDD scheme is applied (for example, 72 subcarriers of the center frequency in the used frequency band) for information transmission and the PRACH may be allocated to the uplink radio resources of the CC #2 to which the TDD scheme is applied for information transmission.

<Downlink L1/L2 Control Signal>

Figure 5:
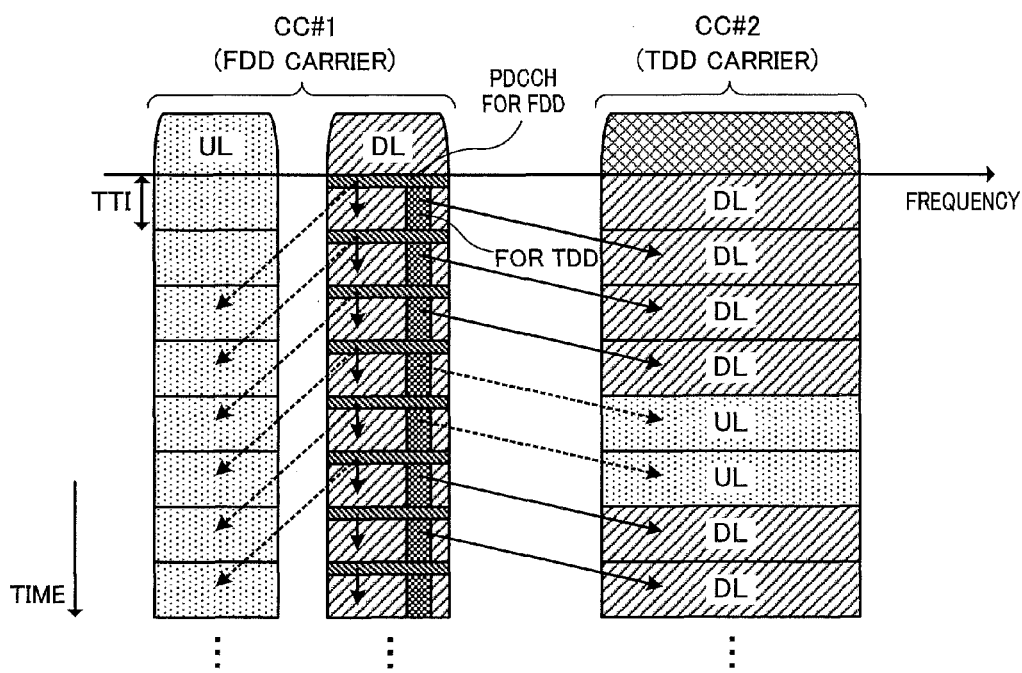
FIG. 5 is a diagram illustrating an example of the radio communication system to which the FDD and TDD schemes are applied according to the present embodiment.

FIG. 5 illustrates an example of transmission of a downlink L1/L2 control signal in the radio communication system formed with the first fundamental frequency block (CC #1) to which the FDD scheme is applied and the second fundamental frequency block (CC #2) to which the TDD scheme is applied.

The downlink L1/L2 control signal is a signal for controlling the layers 1 and 2 and is formed with RB allocation information in the PDSCH to each mobile terminal apparatus, control information such as retransmission related information, data modulation scheme and channel coding rate and so on. And, the downlink L1/L2 control signal is controlled in transmission by using a PCFICH (Physical Control Format Indicator CHannel), a PDCCH (Physical Downlink Control CHannel) and a PHICH (Physical Hybrid-ARQ Indicator CHannel).

The PDCCH is a control channel to indicate scheduling information of PUSCH (Physical Uplink Shared CHannel) and PDSCH (Physical Downlink Shared CHannel) and format information such as modulation scheme and channel coding rate and so on. This PDCCH is allocated to downlink radio resources.

The PCFICH is a physical channel to use in communicating the number of radio resources used in transmission of PDCCHs in each of subframes, with use of OFDM symbol number, and this channel is allocated to the first (3 OFDM symbols at the maximum) of each subframe on the downlink.

The PHICH is a control channel to transmit ACK/NACK (Acknowledgement/Negative Acknowledgement) of HARQ (Hybrid Automatic Repeat ReQuest) for the PUSCH and is allocated to the first of each subframe on the downlink.

In this embodiment, the downlink L1/L2 control signal corresponding to the first fundamental frequency block (CC #1) and the downlink L1/L2 control signal corresponding to the second fundamental frequency block (CC #2) are allocated together to either of the CC #1 to which the FDD scheme is applied and the CC #2 to which the TDD scheme is applied.

FIG. 5 illustrates the case where the PDCCHs corresponding to the CC #1 and the PDCCHs corresponding to the CC #2 are allocated together to the downlink radio resources of the CC #1 to transmit information. In this case, each of the PDCCHs corresponding to the CC #2 may be allocated to the area of first symbols of one frame and transmitted like the PDCCHs corresponding to the CC #1 or may be frequency division multiplexed to the area where the PDSCH of the CC #1 is allocated to transmit information as illustrated in FIG. 5. In this way, as the PDCCHs corresponding to the CC #2 are allocated to the downlink radio resources of the CC #1 and transmitted, control information corresponding to the CC #2 to which the TDD scheme is applied can be always transmitted on the uplink and downlink, thereby setting the timings of transmission and reception of various information pieces flexibly while preventing the transmission delay.

Figure 6:
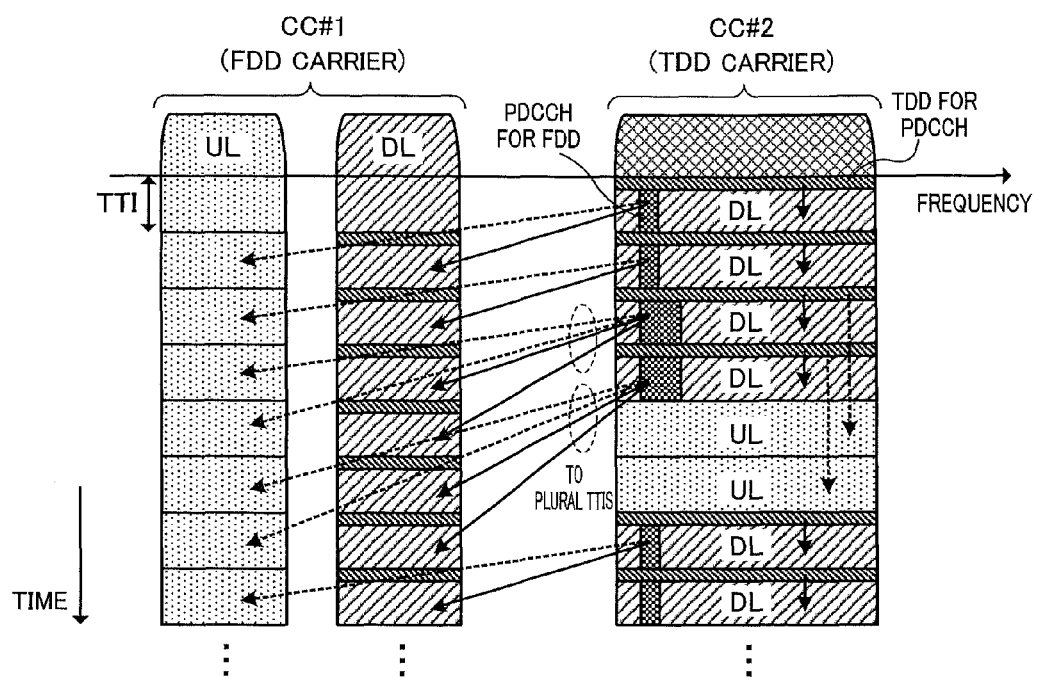
FIG. 6 is a diagram illustrating an example of the radio communication system to which the FDD and TDD schemes are applied according to the present embodiment.

On the other hand, centering on the TDD scheme, the PDCCHs and so on corresponding to the CC #1 and the PDCCHs and so on corresponding to the CC #2 may be allocated to downlink radio resources of the CC #2 to transmit information. In this case, in the CC #2 to which the TDD scheme is applied, as downlink TTIs are reduced in the time direction as compared with the CC #1 to which the FDD scheme is applied, it is preferable that PDCCHs for plural TTIs are allocated to one downlink TTI of the CC #2 to transmit information (see FIG. 6).

<Uplink L1/L2 Control Signal>

Figure 7:
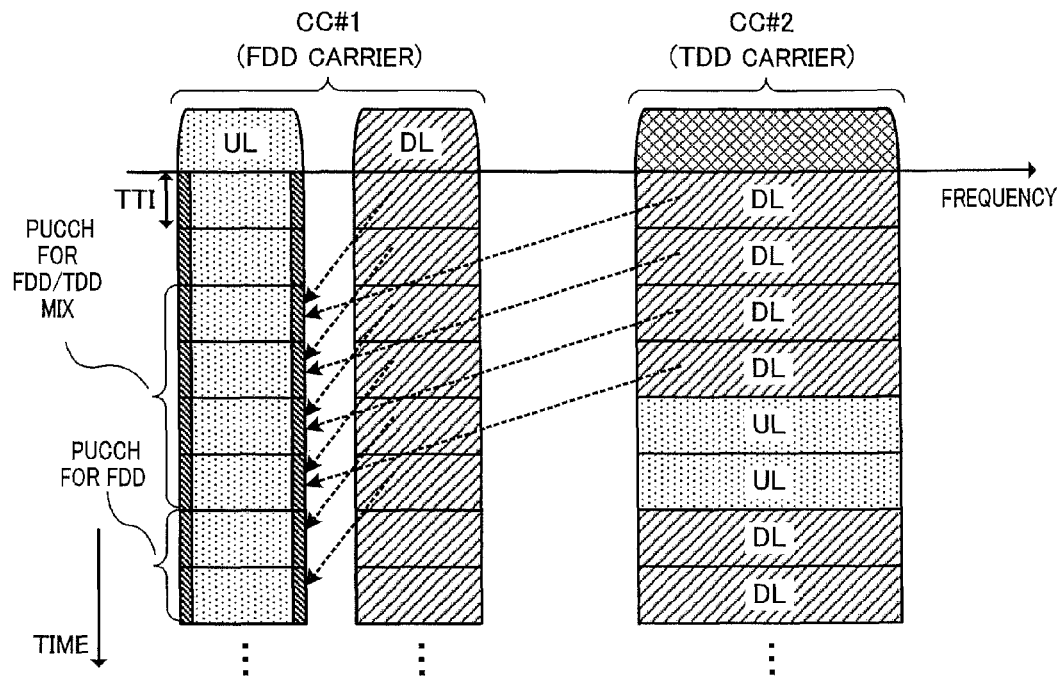
FIG. 7 is a diagram illustrating an example of the radio communication system to which the FDD and TDD schemes are applied according to the present embodiment.

FIG. 7 illustrates an example of transmission of an uplink L1/L2 control signal in the radio communication system formed with the first fundamental frequency block (CC #1) to which the FDD scheme is applied and the second fundamental frequency block (CC #2) to which the TDD scheme is applied.

The uplink L1/L2 control signal is a signal for controlling layers 1 and 2, and is formed to include control information such as channel quality information (CQI: Channel Quality Indicator) report for downlink frequency scheduling, ACK/NACK for downlink transmission data, scheduling request to show the mobile terminal apparatus needs uplink resources for data transmission and so on.

And, the control signal to be transmitted on the uplink is time division multiplexed with a PUSCH when it is transmitted together with user data. Or, when the control signal is transmitted alone, it is allocated to the uplink control channel (PUCCH: Physical Uplink Control CHannel).

The PUCCH is used to transmit reception channel information measured by the mobile terminal apparatus and acknowledgement information of the downlink PDSCH. The subframe structure is such that 7 SC-FDMA symbols are contained in one slot (½ subframe) and data signals and reference signals are time division multiplexed so as to prevent the increase in peak power. And, the reception channel quality information (CQI) measured by the mobile terminal apparatus mentioned above, and the acknowledgement information (ACK/NACK) of the downlink PDSCHs are both transmitted in a 12-subcarrier band. Specifically, different subframe structures are adopted for CQI and ACK/NACK and the ACK/NACK subframe structure (ACK/NACK format) is such that RSs are multiplexed to the $3^{rd}$ to $5^{th}$ symbols in a slot and control information (ACK/NACK) is multiplexed to the other symbols ($1^{st}$, $2^{nd}$, $6^{th}$ and $7^{th}$ symbols). The above-mentioned slot is repeated twice in one subframe. The PUCCH is multiplexed to radio resources at each of both ends of the system band and inter-slot frequency hopping (Inter-slot FH) is applied to two slots of different frequency bands in one subframe.

In the present embodiment, uplink L1/L2 control signals for the first fundamental frequency block (CC #1) and uplink L1/L2 control signals for the second fundamental frequency block (CC #2) are allocated together to radio resources of either the CC #1 to which the FDD scheme is applied and the CC #2 to which the TDD scheme is applied.

FIG. 7 illustrates the PUCCHs corresponding to the CC #1 and the PUCCHs corresponding to the CC #2 which are allocated together to uplink radio resources of the CC #1 thereby to transmit information. Specifically, the uplink control signals corresponding to the CC #2 are allocated to the PUCCHs of the CC #1 thereby to transmit the information.

In the second fundamental frequency block to which the TDD scheme is applied, uplink and downlink are separated in time and uplink control signals need not to be transmitted in subframes corresponding to the uplink of the TDD scheme (UL time in the figure). That is, in the uplink PUCCHs of the CC #1, there are two cases: one is such that uplink control signals corresponding to the CC #1 and the CC #2 are allocated and the other is such that uplink control signals of the CC #1 are only allocated. In this case, in the uplink PUCCHs of the CC #1, bit information varies whether the uplink control signals corresponding to both the CC #1 and the CC #2 are allocated or the uplink control signals of the CC #1 are only allocated. Therefore, different PUCCH formats of different spread rates, signal structures and so on may be applied to these cases.

And, if the control signals to be transmitted on the uplink are transmitted simultaneously with user data, the PUCCHs corresponding to the CC #1 and the PUCCHs corresponding to the CC #2 may be multiplexed to PUSCHs of the CC #1 and/or the CC #2 and transmitted. If the number of CCs to transmit control signals needs to be restricted to one, the PUCCHs corresponding to the CC #1 and the PUCCHs corresponding to the CC #2 are preferably transmitted together (time division multiplexed) in the PUSCHs of the CC #1 or the CC #2.

Figure 8:
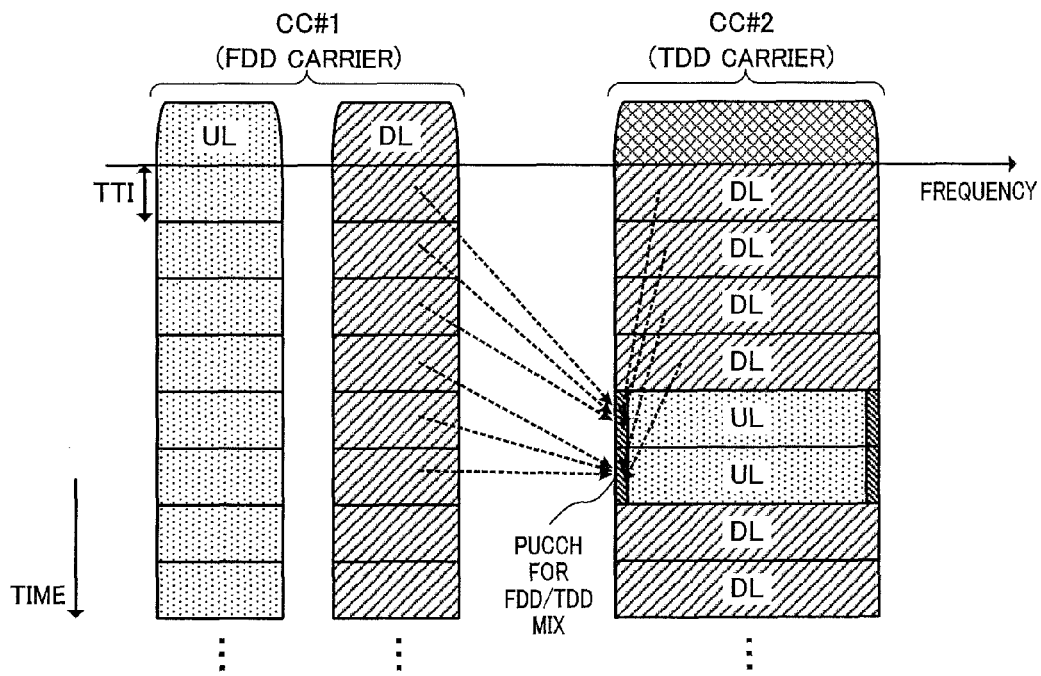
FIG. 8 is a diagram illustrating an example of the radio communication system to which the FDD and TDD schemes are applied according to the present embodiment.

On the other hand, centering on the TDD scheme, the PUCCHs corresponding to the CC #1 and PUCCHs corresponding to the CC #2 may be allocated together to uplink radio resources of the CC #2. In this case, in the CC #2 to which the TDD scheme is applied, uplink TTIs are reduced in the time direction as compared with the CC #1 to which the FDD scheme is applied, and therefore, it is preferable that PUCCHs for plural TTIs are allocated together to one uplink TTI of the CC #2 and transmitted (see FIG. 8).

<Shared Data Channel>

Figure 9:
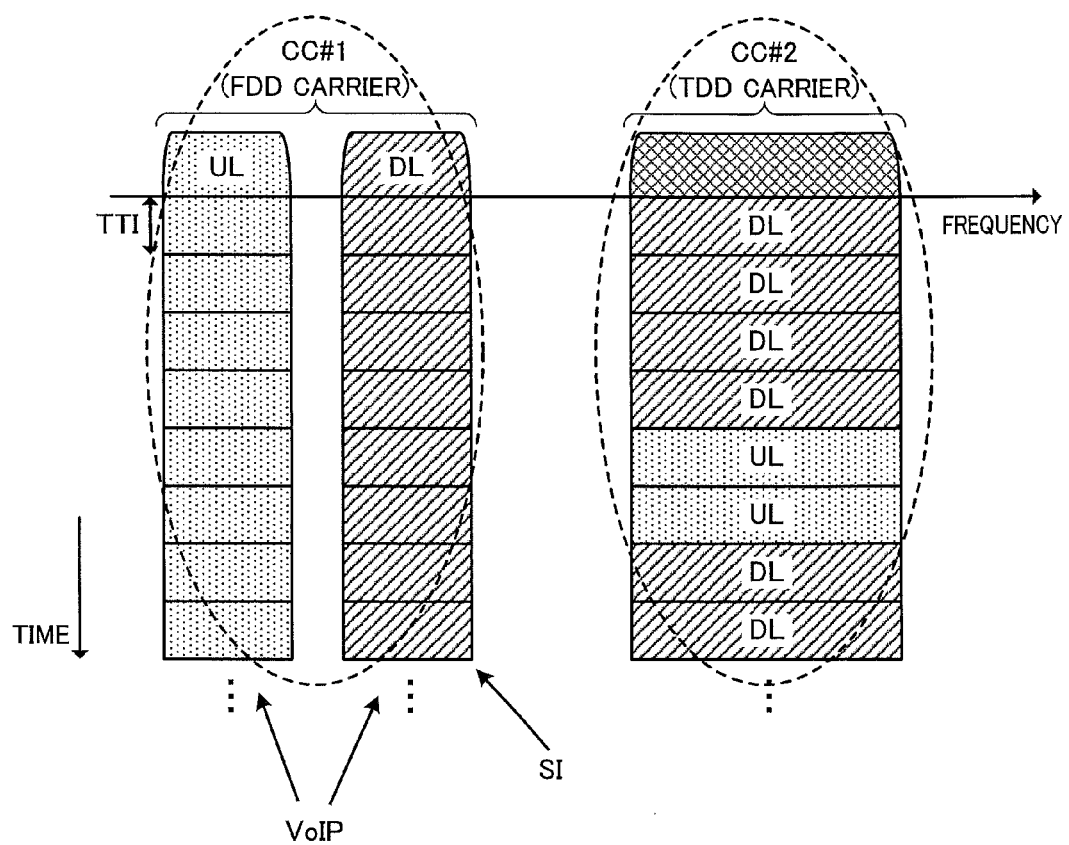
FIG. 9 is a diagram illustrating an example of the radio communication system to which the FDD and TDD schemes are applied according to the present embodiment.

FIG. 9 illustrates an example of transmission of shared data channel (PDSCH, PUSCH) signals in the radio communication system formed with the first fundamental frequency block (CC #1) to which the FDD scheme is applied and the second fundamental frequency block to which the TDD scheme is applied.

The shared data channel signals include not only data traffic that requires high data rates but also broadcast information (SI: System Information), voice data (VoIP: Voice over IP) and so on that have higher priority on coverage than on the transmission speed.

The broadcast information used in the LTE system is classified into MIBs (Master Information Blocks) that are transmitted with use of PBCHs and SIBs (System Information Blocks) that are transmitted with use of PDSCHs. In this case, the MIBs contain information required for downlink reception (downlink bandwidth, downlink control channel structure and so on). On the other hand, the SIBs are divided into SIB 1 to SIB x and the SIB 1 contains scheduling information of following SIBs and SIBs 2 and later contain system information of broadcast information and so on per cell. And, change to the system information is recognized by the mobile terminal apparatus by a PCH (Paging Channel) flag or tag information (System Info Value Tag) contained in the SIB 1.

And, in order to realize voice data (VoIP), application of semi persistent scheduling (SPS) is under study. SPS on the downlink is such that the radio base station apparatus allocates downlink radio resources (PDSCHs) to the mobile terminal apparatus fixedly at predetermined intervals, starting at a subframe (allocation starting point) in which downlink scheduling information is transmitted to the mobile terminal apparatus via the PDCCSs. And, SPS on the uplink is such that starting at a subframe (allocation starting point) 4 ms after the subframe that is transmitted with uplink scheduling grant to the user apparatus via the PDCCHs, the uplink radio resources (PUSCHs) are allocated to the user apparatus fixedly at predetermined intervals.

In this embodiment, shared data channel signals are transmitted with use of either the first fundamental frequency block (CC #1) to which the FDD scheme is applied or the second fundamental frequency block (CC #2) to which the TDD scheme is applied.

In FIG. 9, the broadcast information to be transmitted by use of PDSCHs is allocated to downlink radio resources of the CC #1 to which the FDD scheme is applied (by way of PDSCHs of the CC #1) and transmitted. With this structure, there is an advantageous effect of being able to ensure the coverage.

And, VoIP is allocated to downlink and uplink radio resources of the CC #1 to which the FDD scheme is applied (by way of PDSCHs and PUSCHs of the CC #1) and semi persistent scheduling is adopted. That is, VoIp is performed with use of pair bands of the first fundamental frequency block to which the FDD scheme is applied. In this case, there is an advantageous effect of being able to ensure the coverage.

On the other hand, centering on the TDD scheme, the broadcast information is allocated to downlink radio resources of the CC #2 to which the TDD is applied (by way of PDSCHs of the CC #2) and the VoIP is allocated to uplink and downlink radio resources of the CC #2 to which the TDD is applied (by way of PDSCHs and PUSCHs of the CC #2).

Further, different scrambles may be applied to the CC #1 to which the FDD scheme is applied and the CC #2 to which the TDD scheme is applied. For example, a cell-specific scramble may be applied to the CC #1 and a UE-specific scramble may be applied to the CC #2.

<Downlink Reference Signal>

Figure 10:
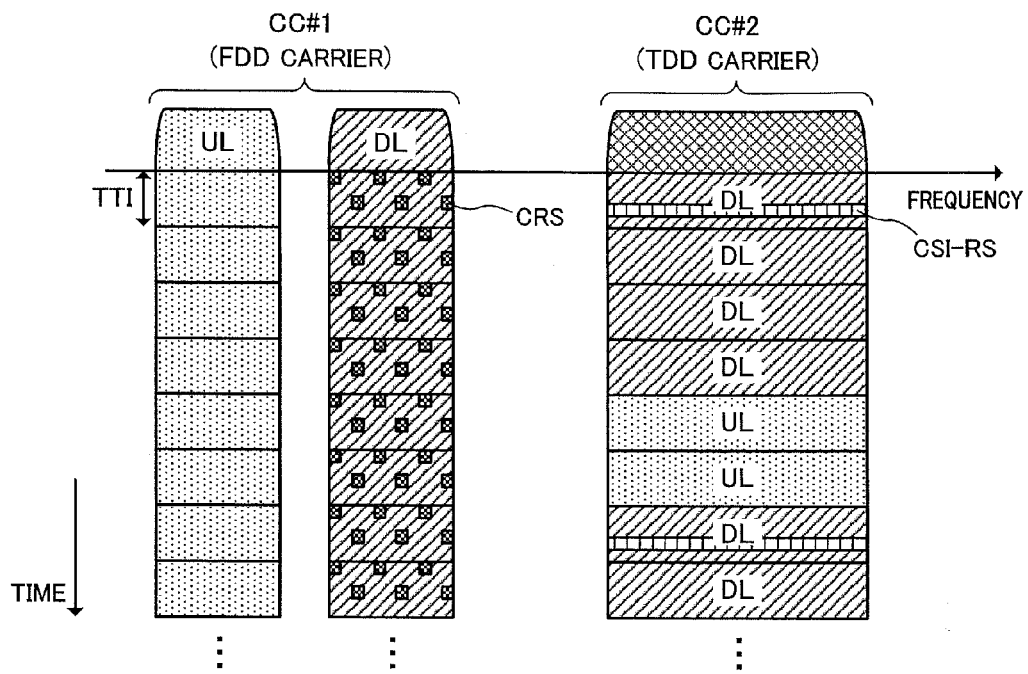
FIG. 10 is a diagram illustrating an example of the radio communication system to which the FDD and TDD schemes are applied according to the present embodiment.

FIG. 10 illustrates an example of transmission of downlink reference signals in the radio communication system formed with the first fundamental frequency block (CC #1) to which the FDD scheme is applied and the second fundamental frequency block (CC #2) to which the TDD is applied.

The downlink reference signals include a cell-common reference signal CRS (Common Reference Signal), a DM-RS (Demodulation Reference Signal), a CSI-RS (Channel State Information-Reference Signal) and the like.

The CRS is used in demodulation of transmission data, downlink channel quality (CQI) measurement for scheduling and adaptive control, and downlink average propagation path state measurement (mobility measurement) for cell search and handover.

In the downlink of the LTE-A system, there are defined not only the CRS but also the CSI-RS specially for CQI measurement. The CSI-RS is provided for CQI measurement for plural cells in consideration of transmission and reception of data channel signals at CoMP (Coordinated Multiple Point). The CSI-RS is used in CQI measurement of adjacent cells and is different from the CRS used for CQI measurement of only a serving cell.

In this embodiment, transmission may be performed in such a manner that CRSs are allocated to the downlink radio resources of the first fundamental frequency block (CC #1) and CSI-RSs are allocated to the downlink resources of the second fundamental frequency block (CC #2). In this case, on the uplink of the CC #2 to which the TDD scheme is applied, adaptive transmission may be employed using Channel reciprocity based on received CSI-RSs.

And in the downlink radio resources of the CC #2, CRSs may be allocated to some of them or may not be allocated at all. Or, the DM-RSs may be allocated to downlink radio resources of both of the CC #1 and the CC #2 and transmitted.

Besides, transmission may be performed in such a manner that CRSs are allocated to the downlink radio resources of the CC #2 and CSI-RSs are allocated to the downlink resources of the CC #1.

<Uplink Reference Signal>

Figure 11:
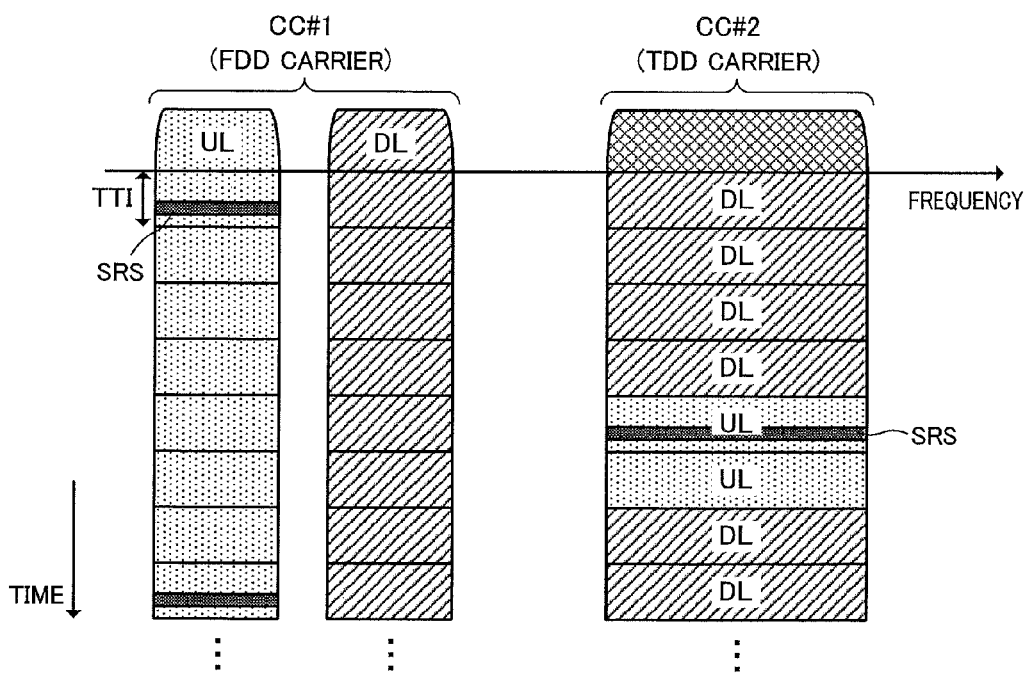
FIG. 11 is a diagram illustrating an example of the radio communication system to which the FDD and TDD schemes are applied according to the present embodiment.

FIG. 11 illustrates an example of transmission of uplink reference signals in the radio communication system formed with the first fundamental frequency block (CC #1) to which the FDD scheme is applied and the second fundamental frequency block (CC #2) to which the TDD is applied.

As uplink reference signals, there are demodulation reference signals (DM RSs) of physical uplink shared channels and uplink control channels, and sounding reference signals (SRSs).

In Release 8 LTE, SRSs are multiplexed to last symbols of subframes that form a uplink radio frame and transmitted from the mobile terminal apparatus to the radio base station apparatus periodically. The radio base station apparatus measures uplink channel quality based on SRSs for channel quality measurement transmitted from the mobile terminal apparatus, performs scheduling for the mobile terminal apparatus to transmit data channel signals (PUSCHs) and gives instructions with use of PDCCHs.

In the present embodiment, SRSs are allocated to the uplink radio resources of the first fundamental frequency block (CC #1) and uplink radio resources of the second fundamental frequency block (CC #2). In this case, the SRSs allocated to the CC #1 and the CC #2 may be controlled separately. For example, the transmission cycle of SRSs in the CC #1 may be shorter than that of the CC #2. And, on the downlink of the CC #2 to which the TDD scheme is applied, adaptive transmission may be performed using channel reciprocity based on the received SRSs. With this structure, it is possible to reduce overhead of SRS transmission.

And, DM-RSs may be allocated to downlink radio resources of both of the CC #1 and the CC #2 and transmitted.

<Radio Communication System Formed with FDD Scheme and Half Duplex FDD Scheme>

Figure 12:
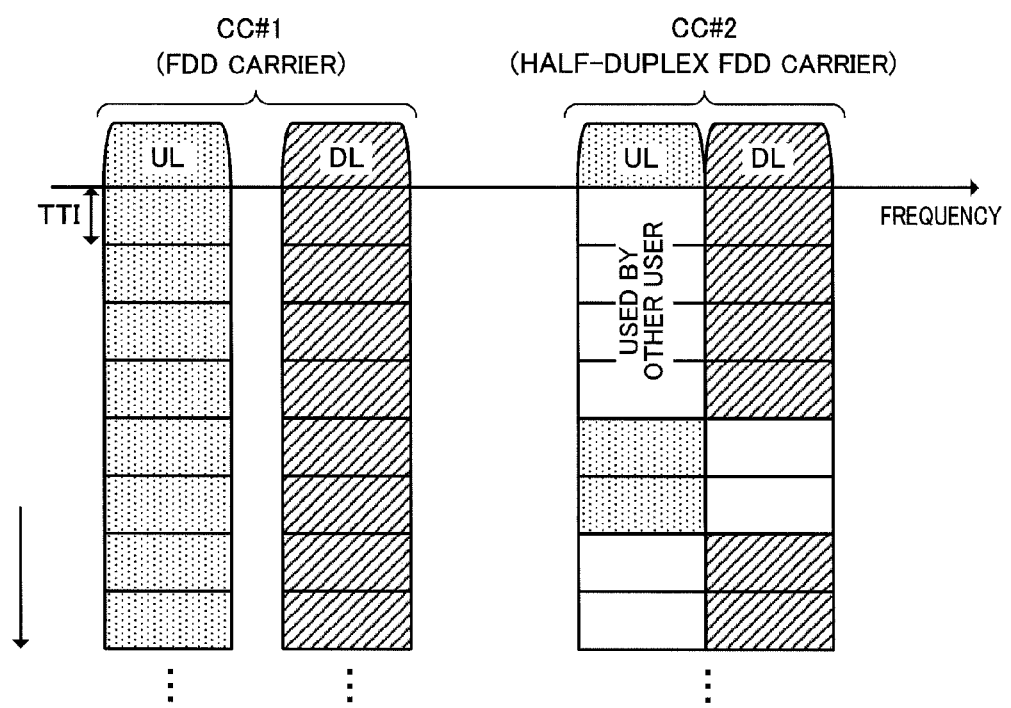
FIG. 12 is a diagram illustrating an example of the radio communication system to which the FDD and TDD schemes are applied according to the present embodiment.

In FIGS. 3 to 11 above, the radio communication system formed with the first fundamental frequency block (CC #1) to which the FDD scheme is applied and the second fundamental frequency block (CC #2) to which the TDD scheme is applied has been described. However, the present invention is not limited to this. As illustrated in FIG. 12, a half duplex FDD scheme may be applied instead of the TDD scheme. Specifically, FIG. 12 illustrates a radio communication system formed with the first fundamental frequency block (CC #1) to which the FDD scheme is applied and the second fundamental frequency block (CC #2) to which the half duplex FDD scheme is applied.

The half duplex FDD scheme is a communication scheme in which different frequency bands are set in uplink and downlink like in the FDD scheme and the transmission side and the reception side perform data transmission by turns. That is, the uplink and downlink radio resources are not allocated with information simultaneously and the uplink and downlink are separated not only in frequency but also in time. When the half duplex FDD scheme is applied, separation of the uplink and downlink signals is facilitated thereby producing an advantageous effect of being able to simplify the configuration of the mobile terminal apparatus.

The radio communication system formed with the first fundamental frequency block (CC #1) to which the FDD scheme is applied and the second fundamental frequency block (CC #2) to which the TDD scheme is applied is also applied with the channel and signal allocation method illustrated in FIGS. 4 to 11 described above. Specifically, in the method illustrated in FIGS. 4 to 11 described above, the TDD scheme may be replaced with the half duplex FDD scheme.

<System Configuration>

The following is description about configurations of a mobile terminal apparatus, a radio base station apparatus and so on to which the above-described radio communication system is applied. Here, it is assumed that the radio base station and the mobile terminal apparatus have a plurality of antennas supporting the LTE-A system.

Figure 13:
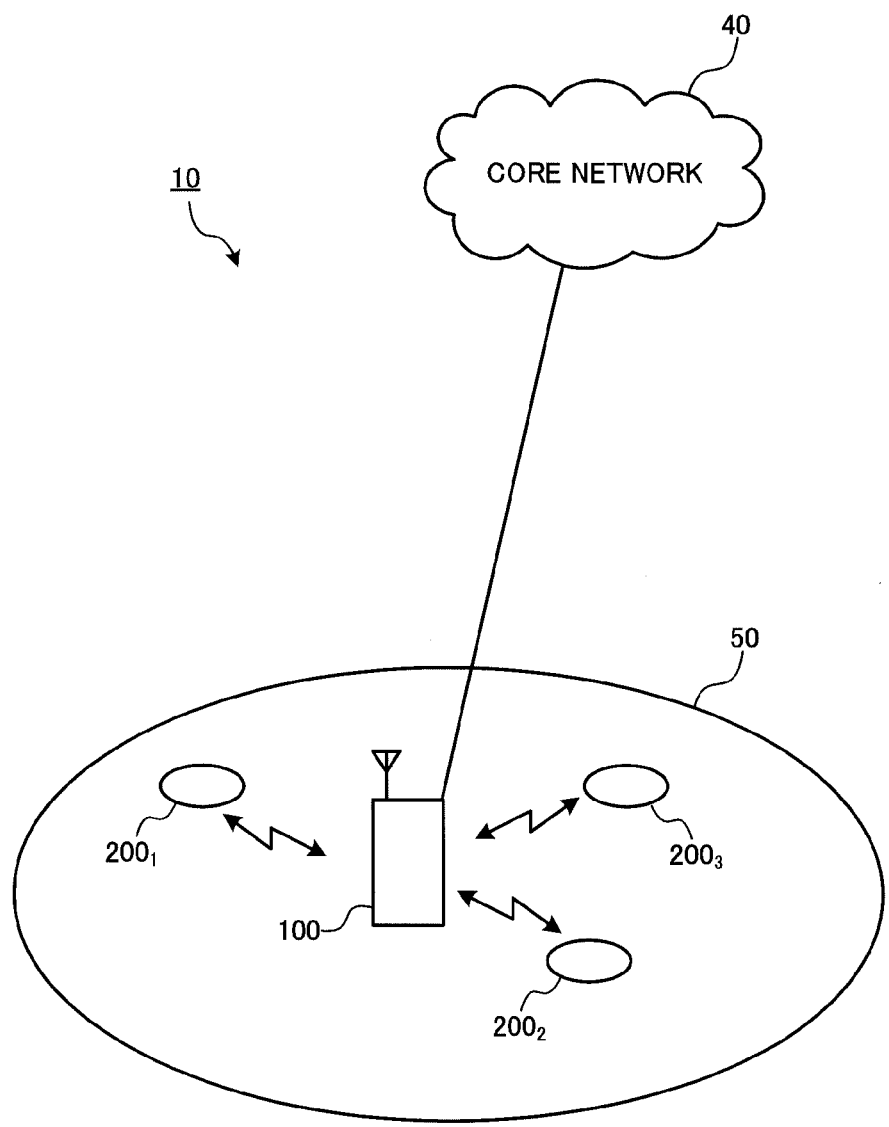
FIG. 13 is a diagram for explaining a configuration of the mobile communication system having mobile terminal apparatuses and a radio base station apparatus according to the present embodiment.

First, with reference to FIG. 13, a radio communication system 1 having a radio base station apparatus 100 and mobile terminal apparatuses 200 will be described. FIG. 13 is a diagram for explaining the configuration of the radio communication system 10 having the radio base station apparatus 100 and the mobile terminal apparatuses 200 according to an embodiment of the present invention. Note that the radio communication system 10 illustrated in FIG. 13 is a system subsuming the LTE system.

As illustrated in FIG. 13, the radio communication system 10 is configured to include the radio base station apparatus 100 and the mobile terminal apparatuses 200 ($200_1$, $200_2$, $200_3$, . . . , $200_n$ where n is an integer greater than 0) that communicate with the radio base station apparatus 100. The radio base station apparatus 100 is connected to a core network 40. The mobile terminal apparatuses 200 communicate with the radio base station 100 in a cell 50. Note that the core network 40 includes, but is not limited to, an access gateway apparatus, a radio network controller (RNC), a mobility management entity (MME) and so on.

In the radio communication system 10, as radio access schemes, OFDMA is applied to the downlink and SC-FDMA is applied to the uplink.

OFDMA is a multicarrier transmission scheme in which communication is performed by dividing a frequency band into a plurality of narrow frequency bands (subcarriers) and mapping data to each of the subcarriers. SC-FDMA is a single carrier transmission scheme in which communication is performed by mapping data to continuous bands per terminal and making terminals use mutually different bands thereby to realize multi access.

Here, description is made about communication channels in the LTE system. On the downlink, there are used PDSCHs for transmitting traffic data of each mobile terminal apparatus 200, PDCCHs for reporting RB allocation information in the PDSCHs and L1/L2 control information such as data modulation scheme and channel coding rate retransmission related information, and so on to the mobile terminal apparatus 200. And, reference signals used in channel estimation, reception quality measurement or the like are transmitted with these channels.

On the uplink, there are used PUSCHs for transmitting traffic data of each mobile terminal apparatus 200, PUCCHs for transmitting L1/L2 control information such as channel quality information (CQI) report for downlink frequency scheduling and ACK/NACK for downlink transmission data and so on. And, demodulation reference signals used in channel estimation and channel quality measurement reference signals used in channel quality measurement are transmitted with these channels.

Figure 14:
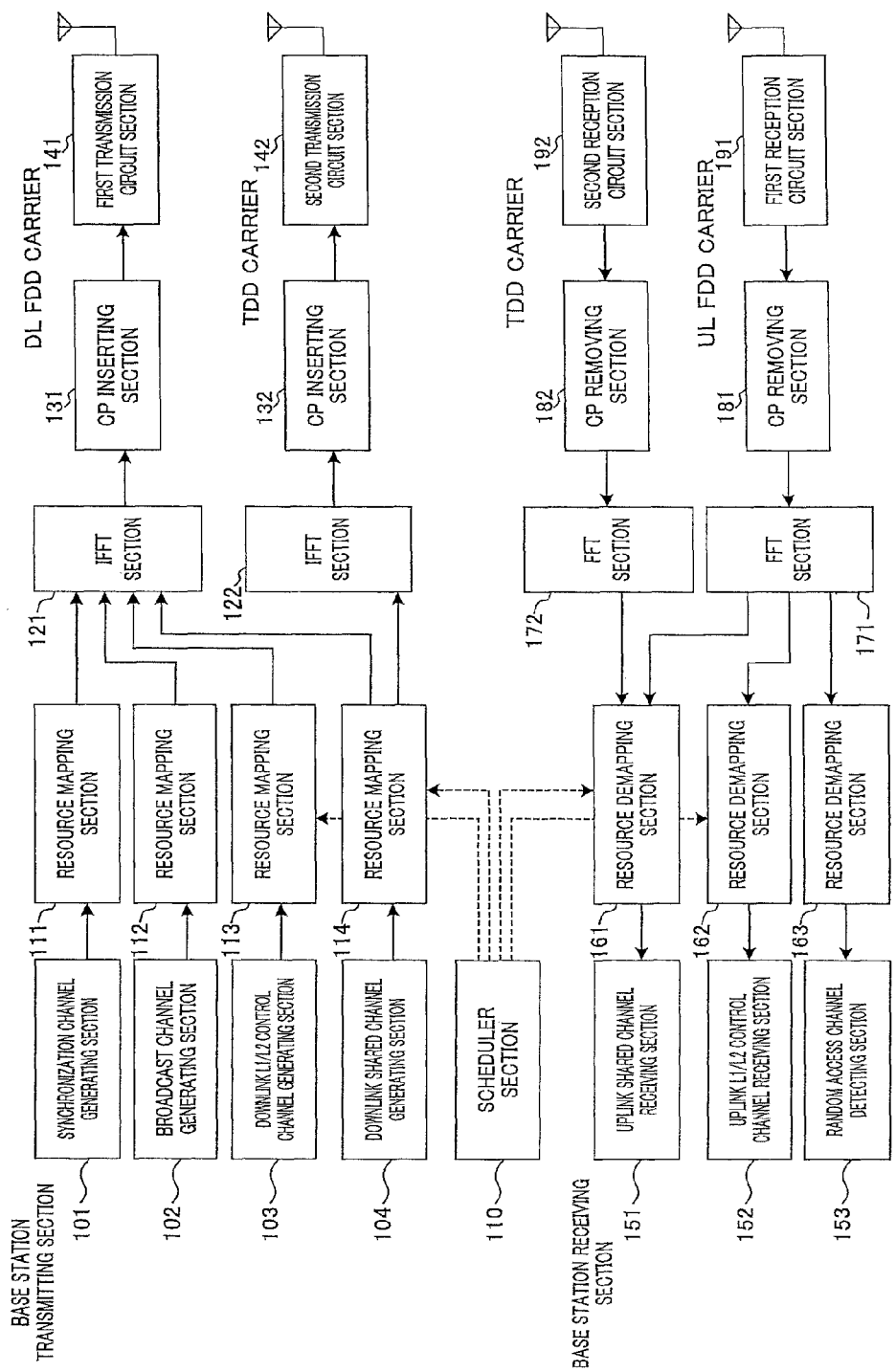
FIG. 14 is a diagram illustrating an overall configuration of the radio base station apparatus according to the embodiment of the present invention.

Next description is made, with reference to FIG. 14, about an example of a functional configuration of the radio base station apparatus that makes up the radio communication system described above.

The radio base station apparatus illustrated in FIG. 14 has a transmitting section and a receiving section. The transmitting section has a synchronization channel generating section 101, a broadcast channel generating section 102, a downlink L1/L2 control channel generating section 103, a downlink shared channel generating section 104, resource mapping sections 111 to 114 for allocating signals to radio resources, IFFT sections 121 and 122 for performing inverse fast Fourier transform on the mapped signals, CP inserting sections 131 and 132 for inserting CPs, a first transmission circuit section 141 for transmitting information to which the FDD scheme is applied and a second transmission circuit section 142 for transmitting information to which the TDD scheme is applied. And, the radio base station apparatus includes a memory for storing software programs and various data and a processor for executing software programs. Each processing may be implemented with use of a hardware or software module such as a memory or processor.

The synchronization channel generating section 101 generates synchronization channel signals to be allocated to downlink radio resources. The broadcast channel generating section 102 generates broadcast channels (PBCH and so on) to be allocated to downlink radio resources. The downlink L1/L2 control channel generating section 103 generates signals (PDCCH signals and so on) to be transmitted with use of downlink L1/L2 control channels. The downlink shared channel generating section 104 generates information (VoIP and so on) to be allocated to downlink radio resources.

The resource mapping sections 111 to 114 perform allocation to radio resources of signals generated by the synchronization channel generating section 101, the broadcast channel generating section 102, the downlink L1/L2 control channel generating section 103 and the downlink shared channel generating section 104. Specifically, signals are mapped to the first fundamental frequency block to which the FDD scheme is applied and to the second fundamental frequency block to which the TDD scheme is applied. Here, it is assumed that the control information required for communication control is allocated to the first fundamental frequency block and other data information is allocated to the second fundamental frequency block, however, this is by no means limiting. Allocation illustrated in FIGS. 4 to 11 described above may be applied. In FIG. 14, no reference signal is shown. However, generated reference signals may be allocated to either fundamental frequency block with use of a resource mapping section.

The receiving section has a first reception circuit section 191 for receiving information to which the FDD scheme is applied, a second reception circuit section 192 for receiving information to which the TDD scheme is applied, CP removing sections 181 and 182 for removing CPs, FFT sections 171 and 172 for performing fast Fourier transform (FFT) on reception signals, resource demapping sections 161 to 163 for separating multiplexed signals, an uplink shared channel receiving section 151 for receiving uplink shared channel signals, an uplink L1/L2 control channel signal receiving section 152 for receiving uplink L1/L2 control channel signals and a random access channel detecting section 153 for detecting random access channels.

The scheduler 110 controls resource allocation to each fundamental frequency block. And, the scheduler 110 performs scheduling of LTE terminal users and LTE-A terminal users separately. Further, the scheduler 110 receives as input retransmission instructions and transmission data from a higher apparatus and channel estimation values and resource block CQIs from the receiving section having measured the uplink signals. The scheduler 110 performs scheduling of uplink and downlink control signals and uplink and downlink shared channel signals with reference to retransmission instructions, channel estimation values and CQIs received as input from the higher apparatus. Transmission paths in mobile communication are different in fluctuation per frequency due to frequency selective fading. Then, when transmitting the user data to mobile terminal apparatuses, adaptive frequency scheduling is applied in which resource blocks of excellent communication quality per subframe are allocated to respective mobile terminal apparatuses. In the adaptive frequency scheduling, a user terminal of excellent propagation path quality is selected and allocated to each resource block. Therefore, the scheduler 110 allocates resource blocks with use of CQIs of the respective resource blocks fed back from the mobile terminal apparatuses. And, a MCS (coding rate and modulation scheme) to fulfill a predetermined block error rate may be determined for allocated resource blocks. Further, as with the second fundamental frequency block to which the TDD scheme is applied, it is preferable that a weighting factor (channel factor) used in reception is applied to weighting in transmission (Channel reciprocity) thereby to control transmission and reception of the information.

Figure 15:
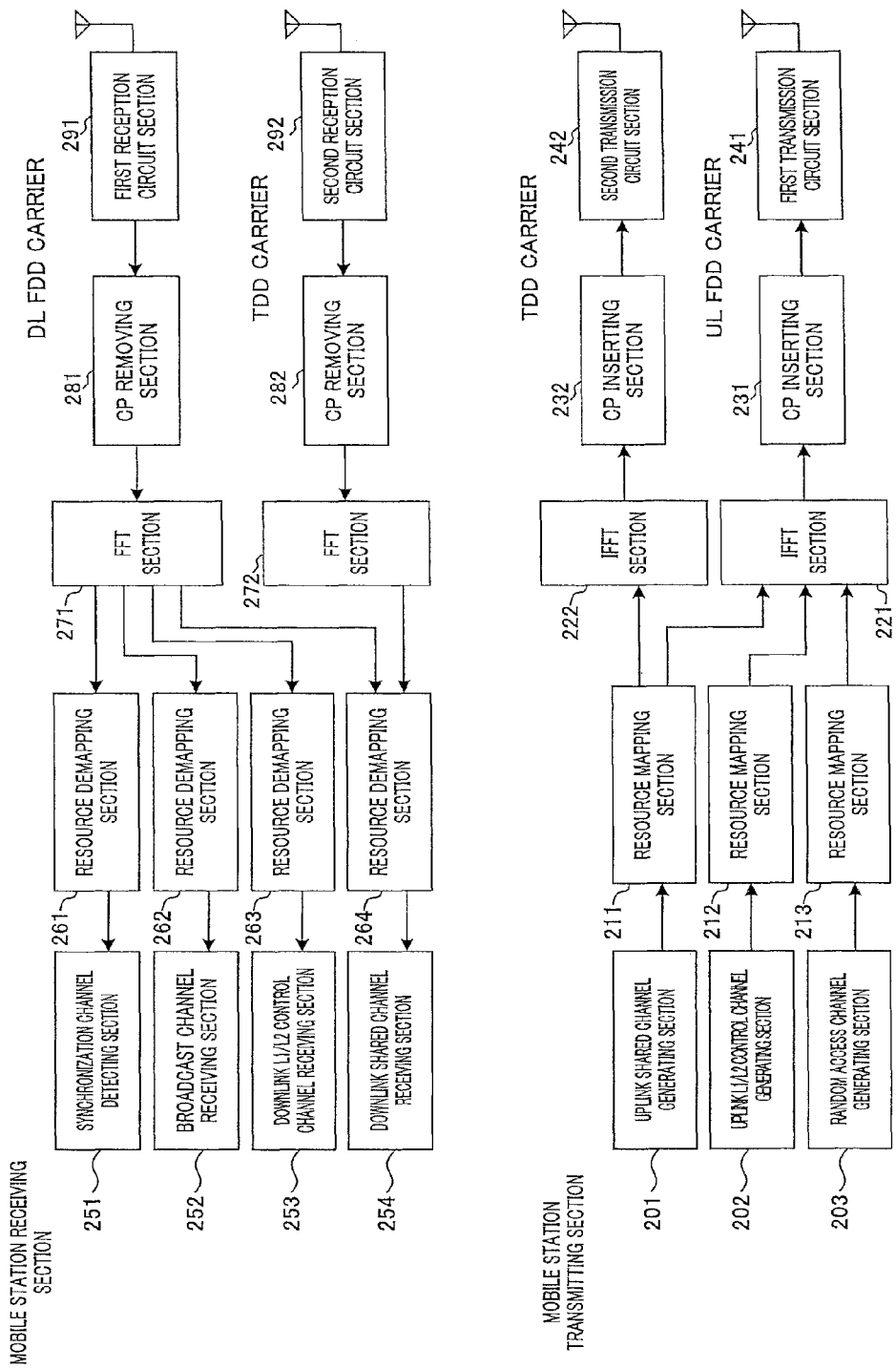
FIG. 15 is a diagram illustrating an overall configuration of the mobile terminal apparatus according to the embodiment of the present invention.

Next description is made, with reference to FIG. 15, about an example of a functional configuration of a mobile terminal apparatus that makes up the above-described radio communication system.

The mobile terminal apparatus illustrated in FIG. 15 has a transmitting section and a receiving section. The transmitting section has an uplink shared channel generating section 201, an uplink L1/L2 control channel generating section 202, a random access channel generating section 203, resource mapping sections 211 to 213 for allocating signals to radio resources, IFFT sections 221 and 222 for performing inverse fast Fourier transform on the mapped information, CP inserting sections 231 and 232 for inserting CPs, a first transmission circuit section 241 for transmitting information to which the FDD scheme is applied and a second transmission circuit section 242 for transmitting information to which the TDD scheme is applied. And, the mobile terminal apparatus includes a memory for storing software programs and various data and a processor for executing software programs. Each processing may be implemented with use of a hardware or software module such as a memory or processor.

The uplink shared channel generating section 201 generates a signal (PUSCH signal) that is transmitted with an uplink shared channel on the uplink radio resources. The uplink L1/L2 control channel generating section 202 generates a signal (PUCCH signal or the like) that is transmitted with an uplink L1/L2 control channel. The random access channel generating section 203 generates a signal (PLACH signal) that is transmitted with a random access channel on the uplink radio resources.

The resource mapping sections 211 to 213 perform allocation to radio resources of signals generated by the uplink shared channel generating section 201, the uplink L1/L2 control channel generating section 202 and the random access channel generating section 203. Specifically, signals are mapped to the first fundamental frequency block to which the FDD scheme is applied and to the second fundamental frequency block to which the TDD scheme is applied. Here, illustrated is the case where control information required for communication control is allocated to the first fundamental frequency block and other data information is allocated to the second fundamental frequency block. This is by no means limiting, allocation illustrated in FIGS. 4 to 11 described above may be applied. In FIG. 14, no reference signal is shown. However, generated reference signals may be allocated to any fundamental frequency block with use of the resource mapping section.

The receiving section has a first reception circuit section 291 for receiving information to which the FDD scheme is applied, a second reception circuit section 292 for receiving information to which the TDD scheme is applied, CP removing sections 281 and 282 for removing CPs, FFT sections 271 and 272 for performing fast Fourier transform (FFT) on reception signals, resource demapping sections 261 to 264 for separating multiplexed signals, a synchronization channel detecting section 251, a broadcast channel receiving section 252, a downlink L1/L2 control channel receiving section 253 and a downlink shared channel receiving section 254.

Note that the number of processing sections and the processing procedure in the above description may be modified as appropriate without departing from the scope of the present invention. And, elements illustrated indicates respective functions and functional blocks may be implemented by hardware or software. Other modifications may be also made as appropriate without departing from the scope of the present invention.

The disclosure of Japanese Patent Application No. 2010-194827, filed on Aug. 31, 2010, including the specification, drawings, and abstract, is incorporated herein by reference in its entirety.

The invention claimed is:

1. A radio communication system having a radio base station apparatus and a mobile terminal apparatus, of which a frequency band allocated to radio communication between the radio base station apparatus and the mobile terminal apparatus is configured by adding or deleting fundamental frequency blocks, wherein
  FDD-based radio communication is as shed to a first fundamental frequency block,
  TDD-based or half duplex FDD-based radio communication is applied to a second fundamental frequency block that is different in frequency from the first fundamental frequency block,
  carrier aggregation is performed by configuring the frequency band with a plurality of fundamental frequency blocks having at least the first fundamental frequency block and the second fundamental frequency block,
  the mobile terminal apparatus allocates first uplink L1/L2 control signals corresponding to the first fundamental frequency block and second uplink L1/L2 control signals corresponding to the second fundamental frequency block to PUCCHs set in uplink radio resources in the first fundamental frequency block,
  the mobile terminal apparatus allocates, to the PUCCHs, the first uplink L1/L2 control signals and the second uplink L1/L2 control signals in a first subframe, and the first uplink L1/L2 control signals and not the second uplink L1/L2 control signals in a second subframe, based on a predetermined subframe of the second fundamental frequency block, and
  the mobile terminal apparatus uses different PUCCH formats in the first subframe and the second subframe.

2. The radio communication system of claim 1, wherein the radio base station apparatus allocates synchronization channels and PBCHs to downlink radio resources in the first fundamental frequency block and the mobile terminal apparatus allocates the PRACHs to uplink radio resources in the first fundamental frequency block thereby to transmit information.

3. The radio communication system of claim 1, wherein the radio base station apparatus allocates first downlink L1/L2 control signals corresponding to the first fundamental frequency block and second downlink L1/L2 control signals corresponding to the second fundamental frequency block to downlink radio resources in the first fundamental frequency block.

4. The radio communication system of claim 3, wherein the radio base station apparatus allocates the first downlink L1/L2 control signals to first symbols of respective subframes in the downlink radio resources in the first fundamental frequency block, and frequency-division-multiplexes the second downlink L1/L2 control signals to downlink shared channel areas of the first fundamental frequency block.

5. The radio communication system of claim 1, wherein the radio base station apparatus allocates broadcast information to be transmitted with use of shared data channels, to downlink radio resources in the first fundamental frequency block and the radio base station apparatus and the mobile terminal apparatus allocate VoIPs to the downlink radio resources and uplink radio resources in the first fundamental frequency block.

6. The radio communication system of claim 1, wherein the radio base station apparatus allocates CRSs to downlink radio resources of the first fundamental frequency block and CSI-RSs to downlink radio resources in the second fundamental frequency block.

7. The radio communication system of claim 1, wherein the mobile terminal apparatus allocates SRSs to uplink radio resources in the first fundamental frequency block and to uplink radio resources in the second fundamental frequency block independently.

8. A radio base station apparatus performing radio communication with a mobile terminal apparatus with use of a communication system of which a frequency band is configured by adding or deleting fundamental frequency blocks, the radio base station apparatus comprising:
  a first reception circuit section configured to receive information to a first fundamental frequency block to which FDD-based radio communication is applied;
  a second reception circuit section configured to receive information to a second fundamental frequency block to which TDD-based or half duplex FDD-based radio communication is applied, the second fundamental frequency block being different in frequency from the first fundamental frequency block; and
  a resource demapping section configured to perform demapping to the first fundamental frequency block and the second fundamental frequency block of the frequency band to which carrier aggregation is applied,
  wherein the resource demapping section separates first uplink L1/L2 control signals corresponding to the first fundamental frequency block and second uplink L1/L2 control signals corresponding to the second fundamental frequency block from PUCCHs set in uplink radio resources in the first fundamental frequency block,
  the first reception circuit section receives, from the PUCCHs, the first uplink L1/L2 control signals and the second uplink L1/L2 control signals in a first subframe, and the first uplink L1/L2 control signals and not the second uplink L1/L2 control signals in a second subframe, based on a predetermined subframe of the second fundamental block, and
  different PUCCH formats are used in the first subframe and the second subframe.

9. A mobile terminal apparatus performing radio communication with a radio base station apparatus with use of a communication system of which a frequency band is configured by adding or deleting fundamental frequency blocks, the mobile terminal apparatus comprising:
  a first transmission circuit section configured to control transmission of information to a first fundamental frequency block to which FDD-based radio communication is applied;
  a second transmission circuit section configured to control transmission of information to a second fundamental frequency block to which TDD-based or half duplex FDD-based radio communication is applied, the second fundamental frequency block being different in frequency from the first fundamental frequency block; and
  a resource mapping section configured to perform mapping to the first fundamental frequency block and the second fundamental frequency block of the frequency band to which carrier aggregation is applied, wherein
  the resource mapping section allocates first uplink L1/L2 control signals corresponding to the first fundamental frequency block and second uplink L1/L2 control signals corresponding to the second fundamental frequency block to PUCCHs set in uplink radio resources in the first fundamental frequency block,
  the resource mapping section allocates, to the PUCCHs, the first uplink L1/L2 control signals and the second uplink L1/L2 control signals in a first subframe, and the first uplink L1/L2 control signals and not the second uplink L1/L2 control signals in a second subframe, based on a predetermined subframe of the second fundamental frequency block, and
  different PUCCH formats are used in the first subframe and the second subframe.

10. The radio communication system of claim 2, wherein the radio base station apparatus allocates first downlink L1/L2 control signals corresponding to the first fundamental frequency block and second downlink L1/L2 control signals corresponding to the second fundamental frequency block to downlink radio resources in the first fundamental frequency block.

* * * * *